United States Patent [19]
Keith

[11] Patent Number: 5,381,180
[45] Date of Patent: Jan. 10, 1995

[54] METHOD AND APPARATUS FOR GENERATING CLUT-FORMAT VIDEO IMAGES

[75] Inventor: Michael Keith, Beaverton, Oreg.
[73] Assignee: Intel Corporation, Santa Clara, Calif.
[21] Appl. No.: 107,260
[22] Filed: Aug. 16, 1993
[51] Int. Cl.$^6$ .......................................... H04N 11/04
[52] U.S. Cl. ...................................... 348/396; 345/199
[58] Field of Search .................. 358/21 R, 12, 11, 13, 358/36, 37; 345/199; 348/488, 391, 392, 393, 396; H04N 11/04

[56] References Cited

U.S. PATENT DOCUMENTS

4,654,695  3/1987  Fling ................................ 358/133 X
5,258,826  11/1993  Wakeland et al. .................... 358/12

*Primary Examiner*—Victor R. Kostak
*Attorney, Agent, or Firm*—Steve Mendelsohn; William H. Murray

[57] ABSTRACT

A method and apparatus for generating a video image by converting full-resolution three-component video data into color-look-up-table (CLUT) index data. The three-component video data are processed to generate N-bit index data for a lookup table that maps to M-bit CLUT index data, where M is less than N. The M-bit CLUT data is then used to generate the video image. In a preferred embodiment used to generate video images from subsampled video data, subsampled video data (e.g., in YUV-9 or YUV-12 format) is first upsampled (e.g., by replication or interpolation) to generate the full-resolution three-component video data. In a different preferred embodiment used to generate dithered video images, the processing of the full-resolution three-component data involves adding noise, truncating the three "noisy" components, and combining the three truncated "noisy" components to generate the N-bit lookup table index data.

24 Claims, 2 Drawing Sheets

METHOD AND APPARATUS FOR GENERATING CLUT-FORMAT VIDEO IMAGES

BACKGROUND OF THE INVENTION

1. Field of the Invention

The present invention relates to video imagery, and, in particular, to methods and apparatuses for generating CLUT-format video images from three-component video data.

2. Description of the Related Art

It is desirable to display real-time motion video on personal computer (PC) systems. In conventional digital video systems, each picture element (i.e., pixel or pel) of a video image is represented by three multi-bit values. For example, in YUV-format systems, each pixel is represented by three 8-bit parameters Y, U, and V. The values of Y, U, and V for a pixel correspond to the color of the pixel.

Theoretically, since each 8-bit parameter Y, U, and V can have $2^8$ or 256 different values, there are $2^{24}$ or 16,777,216 possible combinations of Y, U, and V in YUV format. Most of these combinations, however, either do not correspond to real colors or are not needed to satisfy typical fidelity requirements for video imagery.

To display video images on PC systems, the YUV data for each pixel may be converted to a color look-up table (CLUT) index value. The CLUT is a palette that contains a defined set of colors for display on the PC system. For example, a CLUT may contain $2^8$ or 256 different colors. Since video imagery in YUV format typically contains more than 256 different colors, converting the three 8-bit YUV image data to single 8-bit CLUT index values involves selecting CLUT colors that are "close" to the actual YUV colors.

When displaying video imagery on PC systems having a limited number of CLUT palette colors, color fidelity may be improved by dithering. Dithering involves the "mixing" at the pixel-to-pixel level of different colors from the CLUT palette to give the subjective look of a color closer to the actual YUV color.

It is also desirable, in a PC system for displaying real-time motion video, to store the video data efficiently and to process and display the data sufficiently fast to present the look of real-time motion. To reduce data storage requirements, digital video image data may be stored in a subsampled format. For example, in YUV-9 format, each four-pixel-by-four-pixel subimage of each video image is represented by sixteen 8-bit Y values (i.e., one Y value for each of the sixteen pixels in the subimage), only one 8-bit U value, and only one 8-bit V value. Similarly, in YUV-12 format, each two-pixel-by-two-pixel subimage is represented by four Y values, one U value, and one V value.

It is therefore an object of the present invention to provide methods and apparatuses for generating CLUT-format video images on PC systems.

It is another object of the present invention to convert three-component video data into CLUT format.

It is another object of the present invention to generate dithered video images.

It is another object of the present invention to generate CLUT-format video images from subsampled video data.

It is a specific object of the present invention to convert subsampled video data in YUV-9 or YUV-12 format to full-resolution, dithered, CLUT-format video data with sufficient speed and quality to display real-time motion video on PC systems.

Further objects of this invention will become apparent from the detailed description of a preferred embodiment which follows.

SUMMARY OF THE INVENTION

The present invention is a method and apparatus for generating a video image. According to a preferred embodiment of the present invention, full-resolution three-component video data corresponding to the video image are provided and processed to generate N-bit index data for a lookup table. M-bit CLUT index data are then generated in accordance with the lookup table and the N-bit index data, where M is less than N. The video image is then generated in accordance with the M-bit CLUT index data.

BRIEF DESCRIPTION OF THE DRAWINGS

Other objects, features, and advantages of the present invention will become more fully apparent from the following detailed description of the preferred embodiment, the appended claims, and the accompanying drawings in which

DESCRIPTION OF THE PREFERRED EMBODIMENT(S)

The present invention is a method and apparatus for generating CLUT-format video images from full-resolution three-component video data. Full-resolution video data have three component values for each pixel. The full-resolution, three-component video data are processed to generate for each image pixel an index value for a lookup table. The lookup table, which maps from the index values to CLUT index values, is used to convert the index data to full-resolution CLUT-format video data. The video images may then be generated using the CLUT-format data.

According to preferred embodiments of the present invention, the full-resolution, three-component video data are generated by upsampling subsampled three-component video data either by replication or by interpolation. The subsampled video data may be in either YUV-9 or YUV-12 format. The index data are generated by: (1) adding ordered (or alternatively random) noise to the full-resolution data, (2) truncating the three "noisy" components, and (3) combining the truncated "noisy" components to form a single index value for each pixel. Under this preferred embodiment, dithered video images may be generated.

Figure 1:
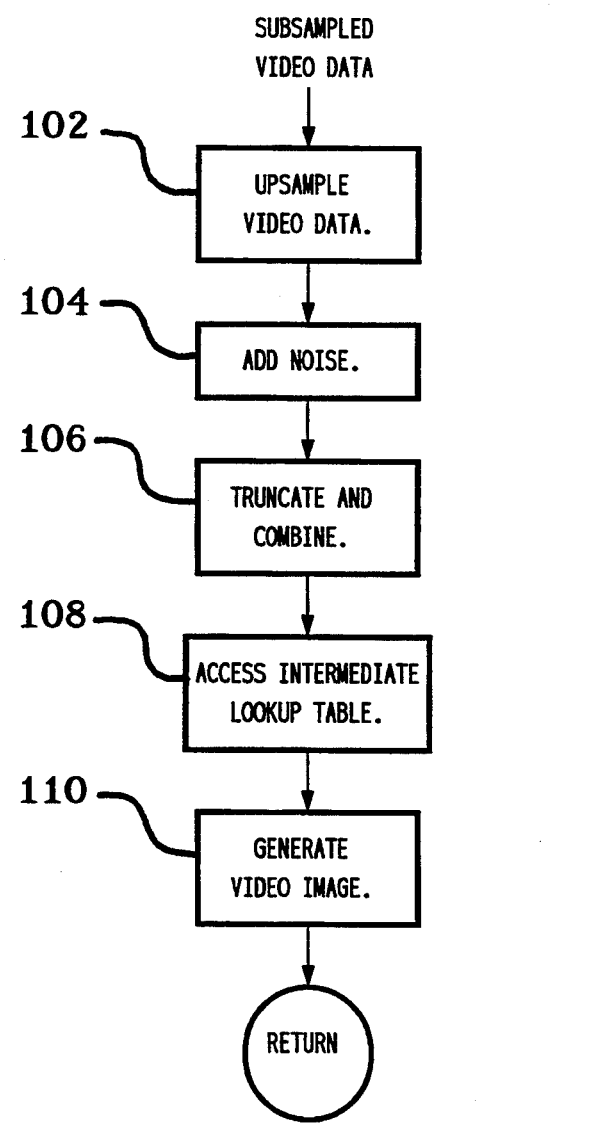
FIG. 1 is a block flow diagram of the processing of a video image generation system according to a preferred embodiment of the present invention.

Referring now to FIG. 1, there is shown a block flow diagram of the processing of a video image generation system 100 according to a preferred embodiment of the present invention. System 100 receives subsampled three-component video data and converts that data to generate CLUT-format video images.

More particularly, means 102 of system 100 receives three-component video data in subsampled YUV-9 format (having one 8-bit U value, one 8-bit V value, and sixteen 8-bit Y values for every (4×4) subimage of every video image). Means 102 upsamples the subsampled data to generate full-resolution, three-component video data. Means 102 performs this upsampling preferably by replicating the U and V data, that is, by copying each U and V value fifteen times so that each pixel of each (4×4) subimage has values for Y, U, and V.

In an alternative preferred embodiment, means 102 upsamples the subsampled data by interpolating between U values and between V values to "fill in" the subimages. While such interpolation may produce images of higher quality than images generated by replication, replication is faster than interpolation.

After means 102 upsamples the subsampled data, means 104 adds ordered noise to the full-resolution, three-component data. The purpose of adding noise is to produce dithered video images. In a preferred embodiment, means 102 adds noise by adding (2×2) dither matrices $D_u$ and $D_v$ to the U and V data, respectfully, such that:

$$D_u = \begin{bmatrix} d_u(0,0) & d_u(0,1) \\ d_u(1,0) & d_u(1,1) \end{bmatrix} = \begin{bmatrix} 32 & 16 \\ 0 & 48 \end{bmatrix} \quad (1)$$

and $$D_v = \begin{bmatrix} d_v(0,0) & d_v(0,1) \\ d_v(1,0) & d_v(1,1) \end{bmatrix} = \begin{bmatrix} 0 & 32 \\ 48 & 16 \end{bmatrix} \quad (2)$$

For example, adding noise to a (4×4) sub image having U values:

$$\begin{array}{cccc}
u(0,0) & u(0,1) & u(0,2) & u(0,3) \\
u(1,0) & u(1,1) & u(1,2) & u(1,3) \\
u(2,0) & u(2,1) & u(2,2) & u(2,3) \\
u(3,0) & u(3,1) & u(3,2) & u(3,3)
\end{array}$$

becomes:

$$\begin{array}{cccc}
u(0,0)+32 & u(0,1)+16 & u(0,2)+32 & u(0,3)+16 \\
u(1,0) & u(1,1)+48 & u(1,2) & u(1,3)+48 \\
u(2,0)+32 & u(2,1)+16 & u(2,2)+32 & u(2,3)+16 \\
u(3,0) & u(3,1)+48 & u(3,2) & u(3,3)+48
\end{array}$$

and having V values:

$$\begin{array}{cccc}
v(0,0) & v(0,1) & v(0,2) & v(0,3) \\
v(1,0) & v(1,1) & v(1,2) & v(1,3) \\
v(2,0) & v(2,1) & v(2,2) & v(2,3) \\
v(3,0) & v(3,1) & v(3,2) & v(3,3)
\end{array}$$

becomes:

$$\begin{array}{cccc}
v(0,0) & v(0,1)+32 & v(0,2) & v(0,3)+32 \\
v(1,0)+48 & v(1,1)+16 & v(1,2)+48 & v(1,3)+16 \\
v(2,0) & v(2,1)+32 & v(2,2) & v(2,3)+32 \\
v(3,0)+48 & v(3,1)+16 & v(3,2)+48 & v(3,3)+16
\end{array}$$

After means 104 adds noise to the U and V data, means truncates the 8-bit Y, U, and V data for each pixel and combines the truncated data to form a single 13-bit index value I, where the four most significant bits (MSB's) of I are the four MSB's of the "noisy" V value, the next four bits of I are the four MSB's of the "noisy" U value, and the five least significant bits (LSB's) of I are the five MSB's of the Y value.

The 13-bit index I is the index for a lookup table that preferably maps from the 13-bit index data to standard 8-bit CLUT index data used to generate video images on PC systems. Means 108 uses the values of index I generated by means 106 to access the lookup table to retrieve an 8-bit CLUT index value for each pixel. Means 110 uses these CLUT-format data to generate one or more video images on a PC system display. This processing is performed for each (4×4) subimage of each video image in the sequence of video images to be displayed.

Image generation system 100 is preferably implemented in assembly language code running on a general programmable central processing unit (CPU), such as an Intel 486 processor.

The lookup table is preferably generated off-line. The lookup table contains $2^{13}$ or 8192 entries corresponding to the 8192 possible 13-bit index values $I=(i_{12} i_{11} i_{10} i_9 i_8 i_7 i_6 i_5 i_4 i_3 i_2 i_1 i_0)$. The entry for each index value I corresponds to one of the 256 index values for an 8-bit CLUT table. As described above, the first four bits of I correspond to V data, the second four bits correspond to U data, and the last five bits correspond to Y data. To generate the lookup table, the data for each possible index value I are separated and normalized into 8-bit $Y_{norm}$, $U_{norm}$, and $V_{norm}$ values, such that:

$$Y_{norm} = (i_4 \, i_3 \, i_2 \, i_1 \, i_0 \, 0 \, 0 \, 0)$$

$$U_{norm} = (i_8 \, i_7 \, i_6 \, i_5 \, 0 \, 0 \, 0 \, 0)$$

$$V_{norm} = (i_{12} \, i_{11} \, i_{10} \, i_9 \, 0 \, 0 \, 0 \, 0)$$

The entry for each 13-bit index value I is preferably the CLUT index value that corresponds to the color that is "closest" to the normalized YUV data for that index value I. The "closest" CLUT color for a particular index value I may be found by sequentially comparing its normalized YUV data $Y_{norm}$, $U_{norm}$, and $V_{norm}$ to all 256 CLUT colors and selected the "closest" color.

When means 104 adds noise to U and V data to generate dithered images, overflow may occur if the U or V values are close to 255. For example, if U=241=(1 1 1 1 0 0 0 1), then the addition of an ordered-noise value of 16 or (0 0 0 1 0 0 0 0) causes the 8-bit U value to overflow, leaving (0 0 0 0 0 0 0 1). To avoid erroneous dithering resulting from such overflow, the lookup table is preferably generated taking overflow into account. A "distance" D between the normalized YUV data $Y_{norm}$, $U_{norm}$ and $V_{norm}$ for a particular index value I and a CLUT color $Y_{clut}$, $U_{clut}$, and $V_{clut}$ is defined according to Equation (3) below:

$$D = \min[\sqrt{(Y_{norm} - Y_{clut})^2 + (U_{norm} - U_{clut})^2 + (V_{norm} - V_{clut})^2}, \sqrt{(Y_{norm} - Y_{clut})^2 + (U_{norm} + 256 - U_{clut})^2 + (V_{norm} - V_{clut})^2}, \quad (3)$$

$$\sqrt{(Y_{norm} - Y_{clut})^2 + (U_{norm} - U_{clut})^2 + (V_{norm} + 256 - V_{clut})^2}$$

$$\sqrt{(Y_{norm} - Y_{clut})^2 + (U_{norm} + 256 - U_{clut})^2 + (V_{norm} + 256 - U_{clut})^2}$$

where min returns the smallest of the four square-root expressions. The distance D is used to select the "closest" CLUT color for each of the 8192 possible index values I when generating the lookup table. Those skilled in the art will understand that use of Equation (3) is equivalent to considering UV-space to be a torus rather than a plane.

Figure 2:
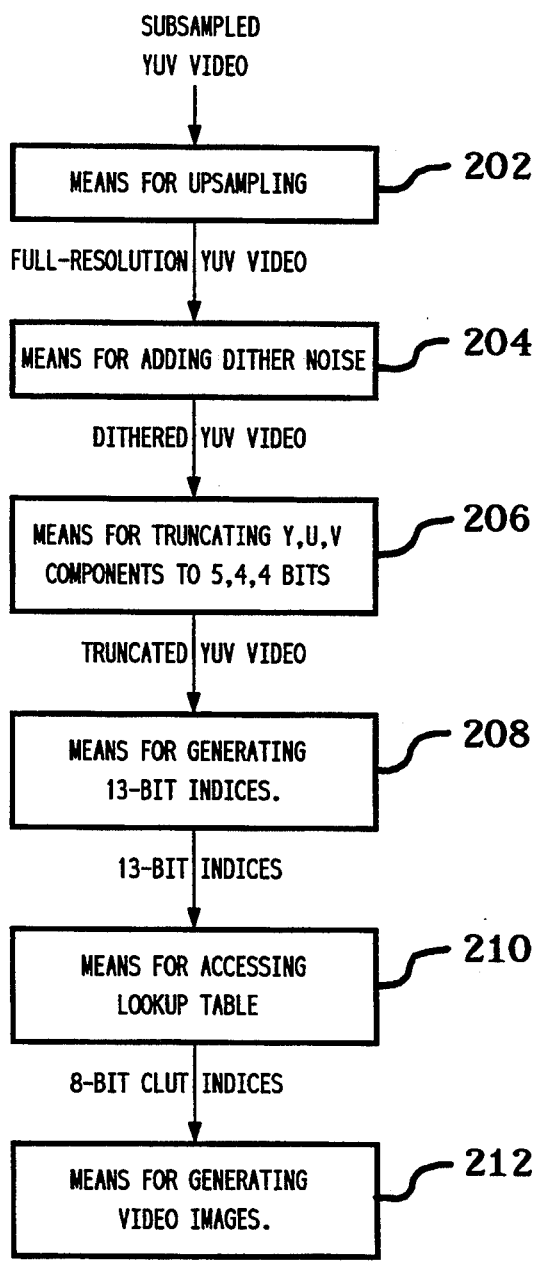
FIG. 2 is a block diagram of the video image generation system of FIG. 1.

Referring now to FIG. 2, there is shown a block diagram of a video image generation system that implements the processing of FIG. 1, according to a preferred embodiment of the present invention. Means 202 receives and upsamples subsampled YUV video data to generate full-resolution YUV video data. Means 204 adds dither noise to the full-resolution YUV video data to generate dithered YUV video data. Means 206 truncates the dithered Y,U,V components to 5,4,4 bits, respectively. Means 208 combines the truncated Y,U,V components to generate 13-bit indices to a lookup table. Means 210 accesses the lookup table using the 13-bit indices to generate 8-bit CLUT indices. Means 212 uses the 8-bit CLUT indices to generate video images.

Those skilled in the art will also understand that alternative preferred embodiments of video image generation system 100 fall within the scope of the present invention. For example, other forms of ordered noise, or even random noise, may be added to the full-resolution, three-component data to produce dithered video images. Similarly, the sizes of the lookup table and the CLUT table may vary. Those skilled in the art will understand that a preferred embodiment of the present invention has a lookup table that is larger than the CLUT table used to generate the video images. As such, the index I preferably has more bits than the CLUT index.

In addition, video image generation systems according to the present invention may be designed to generate video images from video data in formats other than the subsampled YUV-9. For example, systems may be designed to process full-resolution YUV data, subsampled video data in YUV-12 or YUV-16 formats, or various subsampled or full-resolution RGB formats.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating a video image, comprising the steps of:
   (a) providing full-resolution three-component video data corresponding to said video image;
   (b) processing said full-resolution three-component video data to generate N-bit index data for a lookup table;
   (c) generating M-bit CLUT index data in accordance with said lookup table and said N-bit index data, wherein M is less than N; and
   (d) generating said video image in accordance with said M-bit CLUT index data.

2. The method of claim 1, wherein step (a) comprises the steps of:
   (1) providing three-component video data in a subsampled format corresponding to said video image; and
   (2) upsampling said subsampled three-component video data to generate said full-resolution three-component video data.

3. The method of claim 2, wherein step (a)(2) comprises the step of upsampling said subsampled three-component video data by replication.

4. The method of claim 2, wherein step (a)(2) comprises the step of upsampling said subsampled three-component video data by interpolation.

5. The method of claim 2, wherein said subsampled three-component video data is in YUV-9 format.

6. The method of claim 2, wherein said subsampled three-component video data is in YUV-12 format.

7. The method of claim 1, wherein step (b) comprises the step of truncating and combining said full-resolution three-component video data to generate said lookup table index data.

8. The method of claim 7, wherein step (b) comprises the step of adding noise to said full-resolution three-component video data before said truncating and combining.

9. The method of claim 8, wherein said noise is random noise.

10. The method of claim 8, wherein said noise is ordered noise.

11. The method of claim 8, wherein step (b) comprises the step of adding dither matrices to said full-resolution three-component video data before said truncating and combining.

12. The method of claim 1, wherein said three-component video data comprises YUV video data and step (b) comprises the steps of:
   (1) truncating the Y components of said YUV video data after five bits;
   (2) truncating the U components of said YUV video data after four bits;
   (3) truncating the V components of said YUV video data after four bits; and
   (4) combining said truncated Y, U, and V data to generate 13-bit index data for said lookup table, and step (c) comprises the step of generating 8-bit CLUT index data in accordance with said lookup table and said 13-bit index data.

13. An apparatus for generating a video image, comprising:
   (a) means for providing full-resolution three-component video data corresponding to said video image;
   (b) means for processing said full-resolution three-component video data to generate N-bit index data for a lookup table; and
   (c) means for generating M-bit CLUT index data in accordance with said lookup table and said N-bit index data, wherein M is less than N, said M-bit index data useable in generating said video image.

14. The apparatus of claim 13, wherein means (a) comprises:
   (1) means for providing three-component video data in a subsampled format corresponding to said video image; and (2) means for upsampling said subsampled three-component video data to generate said full-resolution three-component video data.

15. The apparatus of claim 14, wherein means (a)(2) comprises means for upsampling said subsampled three-component video data by replication.

16. The apparatus of claim 14, wherein means (a)(2) comprises means for upsampling said subsampled three-component video data by interpolation.

17. The apparatus of claim 14, wherein said subsampled three-component video data is in YUV-9 format.

18. The apparatus of claim 14, wherein said subsampled three-component video data is in YUV-12 format.

19. The apparatus of claim 13, wherein means (b) comprises means for truncating and combining said full-resolution three-component video data to generate said lookup table index data.

20. The apparatus of claim 19, wherein means (b) comprises means for adding noise to said full-resolution three-component video data before said truncating and combining.

21. The apparatus of claim 20, wherein said noise is random noise.

22. The apparatus of claim 20, wherein said noise is ordered noise.

23. The apparatus of claim 20, wherein means (b) comprises means for adding dither matrices to said full-resolution three-component video data before said truncating and combining.

24. The apparatus of claim 13, wherein said three-component video data comprises YUV video data and means (b) comprises:
   (1) means for truncating the Y components of said YUV video data after five bits;
   (2) means for truncating the U components of said YUV video data after four bits;
   (3) means for truncating the V components of said YUV video data after four bits; and
   (4) means for combining said truncated Y, U, and V data to generate 13-bit lookup table index data,
   and means (c) comprises means for generating 8-bit CLUT index data in accordance with said lookup table and said 13-bit index data.

* * * * *

UNITED STATES PATENT AND TRADEMARK OFFICE
CERTIFICATE OF CORRECTION

PATENT NO. : 5,381,180
DATED : 01/10/95
INVENTOR(S) : Michael Keith

It is certified that error appears in the above-indentified patent and that said Letters Patent is hereby corrected as shown below:

Column 4, line 2, after "means" insert --106--.

Column 6, line 2, delete "$\overline{U_{clut]}\ 2}$" and insert therefor -- $\overline{U_{clut)}{}^2{}_]}$ --.

Signed and Sealed this

Twenty-eight Day of March, 1995

BRUCE LEHMAN

Attest:

Attesting Officer

Commissioner of Patents and Trademarks